(12) United States Patent
Kato et al.

(10) Patent No.: US 7,449,056 B2
(45) Date of Patent: Nov. 11, 2008

(54) INK-JET RECORDING INK, RECORDING METHOD AND RECORDING APPARATUS

(75) Inventors: Ryota Kato, Kawasaki (JP); Shoji Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 11/275,008

(22) Filed: Dec. 1, 2005

(65) Prior Publication Data
US 2006/0119680 A1 Jun. 8, 2006

(30) Foreign Application Priority Data
Dec. 8, 2004 (JP) ............................. 2004-355851
Nov. 17, 2005 (JP) ............................. 2005-332474

(51) Int. Cl.
*C09D 11/02* (2006.01)
*G01D 11/00* (2006.01)

(52) U.S. Cl. .................. 106/31.36; 106/31.68; 347/100

(58) Field of Classification Search ............. 106/31.27, 106/31.6, 31.59, 31.89, 31.36, 31.68
See application file for complete search history.

(56) References Cited

U.S. PATENT DOCUMENTS

| | | | | |
|---|---|---|---|---|
| 4,557,761 A | 12/1985 | Kobayashi et al. | ............ | 106/22 |
| 4,632,703 A | 12/1986 | Koike et al. | ............ | 106/22 |
| 4,661,158 A | 4/1987 | Kobayashi et al. | ............ | 106/22 |
| 4,689,078 A | 8/1987 | Koike et al. | ............ | 106/22 |
| 4,838,938 A | 6/1989 | Tomida et al. | ............ | 106/22 |
| 4,853,036 A | 8/1989 | Koike et al. | ............ | 106/20 |
| 4,923,515 A | 5/1990 | Koike et al. | ............ | 106/22 |
| 4,957,553 A | 9/1990 | Koike et al. | ............ | 106/20 |
| 4,969,951 A | 11/1990 | Koike et al. | ............ | 106/22 |
| 4,986,850 A | 1/1991 | Iwata et al. | ............ | 106/25 |
| 5,017,227 A | 5/1991 | Koike et al. | ............ | 106/22 |
| 5,053,078 A | 10/1991 | Koike et al. | ............ | 106/22 |
| 5,067,980 A | 11/1991 | Koike et al. | ............ | 106/22 |

(Continued)

FOREIGN PATENT DOCUMENTS

JP     S61-59911     3/1986

(Continued)

OTHER PUBLICATIONS

English Abstract of JP 62-015271, Jan. 1987, pp. 47-49.*

*Primary Examiner*—Helene Klemanski
*Assistant Examiner*—Veronica Faison Gee
(74) *Attorney, Agent, or Firm*—Fitzpatrick, Cella, Harper & Scinto

(57) ABSTRACT

An ink-jet recording ink comprising water, a colorant and a surfactant, wherein a content of the surfactant is 0.3 mass % or more based on the whole mass of the ink, and the ink further comprises a sucrose compound represented by the formula (i)

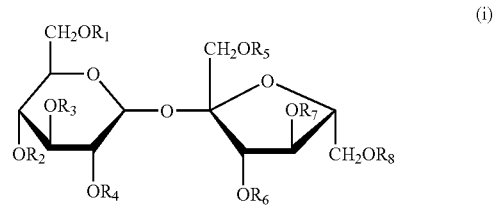

wherein $R_1$ to $R_8$ are individually selected from the group consisting of hydrogen, alkyl groups and alkylene oxide groups, with the proviso that at least one of $R_1$ to $R_8$ is an alkylene oxide group, the total number of alkylene oxide units possessed by the alkylene oxide group in a molecule is 1 to 20, and the proportion of an ethylene oxide unit to the total number of the alkylene oxide units in the molecule is 20.0% or more.

11 Claims, 2 Drawing Sheets

U.S. PATENT DOCUMENTS

| | | | |
|---|---|---|---|
| 5,099,255 A | 3/1992 | Koike et al. | 346/1.1 |
| 5,118,351 A | 6/1992 | Shirota et al. | 106/22 |
| 5,141,558 A | 8/1992 | Shirota et al. | 106/22 |
| 5,151,128 A | 9/1992 | Fukushima et al. | 106/20 |
| 5,190,581 A | 3/1993 | Fukushima et al. | 106/20 D |
| 5,220,347 A | 6/1993 | Fukushima et al. | 346/1.1 |
| 5,221,333 A | 6/1993 | Shirota et al. | 106/20 D |
| 5,248,991 A | 9/1993 | Shirota et al. | 346/1.1 |
| 5,250,121 A | 10/1993 | Yamamoto et al. | 106/22 R |
| 5,254,157 A | 10/1993 | Koike et al. | 106/20 D |
| 5,257,036 A | 10/1993 | Koike et al. | 346/1.1 |
| 5,258,066 A | 11/1993 | Kobayashi et al. | 106/22 R |
| 5,296,022 A | 3/1994 | Kobayashi et al. | 106/20 D |
| 5,329,305 A | 7/1994 | Fukushima et al. | 347/95 |
| 5,356,464 A | 10/1994 | Hickman et al. | 106/20 R |
| 5,358,558 A | 10/1994 | Yamamoto et al. | 106/22 R |
| 5,540,764 A | 7/1996 | Haruta et al. | 106/20 R |
| 5,658,376 A | 8/1997 | Noguchi et al. | 106/31.43 |
| 5,686,951 A | 11/1997 | Koike et al. | 347/106 |
| 5,782,967 A | 7/1998 | Shirota et al. | 106/31.58 |
| 5,997,623 A | 12/1999 | Lin | 106/31.58 |
| 6,214,963 B1 | 4/2001 | Noguchi et al. | 528/71 |
| 6,552,156 B2 | 4/2003 | Noguchi et al. | 528/71 |
| 6,698,876 B2 | 3/2004 | Sato et al. | 347/100 |
| 6,964,700 B2 | 11/2005 | Uji et al. | 106/31.28 |
| 7,141,105 B2 | 11/2006 | Udagawa et al. | 106/31.49 |
| 7,144,449 B2 | 12/2006 | Udagawa et al. | 106/31.15 |
| 2004/0027404 A1 | 2/2004 | Nagashima et al. | 347/8 |
| 2005/0229811 A1 | 10/2005 | Kato et al. | 106/31.43 |

FOREIGN PATENT DOCUMENTS

| | | |
|---|---|---|
| JP | S61-59912 | 3/1986 |
| JP | S61-59914 | 3/1986 |
| JP | 61-59911 B2 | 12/1986 |
| JP | 61-59912 B2 | 12/1986 |
| JP | 61-59914 B2 | 12/1986 |
| JP | 62015271 A * | 1/1987 |
| JP | H6-157955 | 6/1994 |
| JP | H11-12520 | 1/1999 |

* cited by examiner

INK-JET RECORDING INK, RECORDING METHOD AND RECORDING APPARATUS

BACKGROUND OF THE INVENTION

1. Field of the Invention

The present invention relates to an ink-jet recording ink (hereinafter abbreviated as "ink") which is suitable for use in an ink-jet recording system, and particularly to an ink which does not cause a problem of curling of a recording medium containing cellulose even when a water-based ink is applied in plenty to the recording medium, and has good responsiveness to high drive frequencies, storage stability upon long-term storage of the ink and resistance to sticking on an ink-jet recording head. The present invention also relates to an ink-jet recording method and an ink-jet recording apparatus using the ink.

2. Related Background Art

An ink-jet recording method is a system wherein minute droplets of ink are ejected to apply to a recording medium such as paper, thereby conducting recording. According to a thermal system wherein electrothermal converters are used as ejection-energy supply means to apply thermal energy to an ink so as to generate bubbles, thereby ejecting droplets of the ink, the formation of a high-density multi-orifice in an ink-jet recording head can be realized with ease. The feature of the thermal system resides in that high-resolution and high-quality images can be recorded at high speed (see, for example, Japanese Patent Publication Nos. S61-59911, S61-59912 and S61-59914).

In recent years, the size of an ink droplet ejected from a single nozzle has come to be made smaller for purpose of providing high-quality ink-jet recorded images of silver halide photograph level. Ink-jet printers, the amount of an ink droplet ejected from which is about 5 pL (picoliters) or smaller, are currently marketed. With respect to a recording speed as well, still higher speeding-up is required. Attending to this requirement, it is of urgent necessity for printers to meet a higher drive frequency and to improve sticking resistance. It is also necessary to always retain an ink in a stable state so as to achieve stable ejection when the ink is left to stand for a long period of time under various environments, namely, to improve the storage stability of the ink.

On the other hand, inks used in ink-jet recording generally comprise water as a principal component and additionally include a water-soluble high-boiling solvent such as glycol for the purpose of, for example, preventing drying and improving resistance to sticking on an ink-jet recording head. When such inks are used to conduct recording on a recording medium containing cellulose, typified by plain paper, light-weight coated paper or the like, there is offered a problem that curling occurs when a great amount of the inks are applied to a region not smaller than that of a certain area in a short period of time. This problem has not been offered in the recording mainly for characters that has heretofore been mainly conducted, since the amount of the inks applied is relatively small. However, this problem is an important problem to be solved upon recording of information with images on a home-page in the Internet, photographic images or the like on plain paper or the like containing cellulose, which requires to apply inks in plenty.

As opposed to this, water-based ink compositions containing various kinds of anti-curling solvents have been proposed (see, for example, Japanese Patent Application Laid-Open Nos. H6-157955 and H11-12520). According to the techniques described in these documents, an effect on curling resistance is recognized to some extent, but further improvements are desired as to simultaneously satisfy responsiveness upon ejection at high drive frequencies, sticking resistance, and curling resistance.

The present inventors have carried out an investigation as to basic properties of an ink-jet recording ink against the problem with the background of a future technical trend as described above. Specifically, the present inventors have carried out a vigorous investigation as to ink-jet recording printers that cause no problem of curling in a recording medium containing cellulose even when a great amount of inks are applied to the recording medium (curling resistance), and can meet high-definition recording of images while retaining good responsiveness to ejection at a high drive frequency, specifically, frequency exceeding 10 kHz (frequency responsiveness), storage stability under a long-term storage of inks, resistance to sticking on an ink-jet recording head (clogging resistance of a nozzle), and the like at high levels. As a result, it has been found that an ink of a composition containing a compound having a particular nature can achieve the above-described object at an extremely high level, thus leading to completion of the present invention. The improvements to be required of an ink will now be outlined.

1. Curling Resistance:

When a great amount of a water-based ink is applied to a recording medium containing cellulose, typified by plain paper, a phenomenon of the so-called curling is easily to be caused, and so the paper may be rounded in a cylindrical form in some cases. The occurrence of the curling is considered to be attributable to such a condition that in a step of drying paper on a paper making stage, water is evaporated in a state that a tension has been applied in a fixed direction, and a hydrogen bond is formed between cellulose molecules. When a water-based ink is applied to the paper of this state, the hydrogen bond between the cellulose molecules is broken by water, and the bonding site is replaced by water. When the water is evaporated, a hydrogen bond is formed again between the cellulose molecules. Since no tension is applied upon the reformation of this hydrogen bond, the paper is shrunk toward the ink-applied side. As a result, it is considered to cause curling.

As described above, the curling phenomenon is hard to be caused in recording mainly for characters because the amount of inks applied to the recording medium is relatively small. However, the curling phenomenon becomes a great problem at the present time the frequency of graphic printing is increasing, and so higher improvement in curling resistance compared with the before is required for ink-jet recording. In particular, it is greatly required to improve the curling resistance upon recording on a recording medium having a recording area of 15 $cm^2$ or more and containing cellulose in an amount of a water-based ink applied within a range of from 0.03 to 30 mg/$cm^2$, further from 0.1 to 20 mg/$cm^2$.

2. Frequency Responsiveness:

When ejection is continuously conducted at a high drive frequency in an On-Demand type ink-jet system, refill of an ink into a nozzle cannot be made in time according to the physical and/or chemical properties of the ink, and so the next ejection may start in some cases before completion of the refill. As a result, ejection failure occurs, or an ejected ink quantity is extremely reduced. This phenomenon is more marked as droplets ejected become smaller.

3. Storage Stability:

It is important to retain an ink in a stable state so as to always achieve stable ejection without causing physical changes such as aggregation and viscosity increase and without being affected by pH change or substances dissolved out of an ink flow path even when the ink is left to stand under low-temperature and high-temperature environments. Incidentally, the storage stability of the ink also greatly affects the following sticking resistance.

4. Sticking Resistance (Clogging Resistance of a Nozzle):

Another problem caused by evaporation of water in an ink that occurs at an orifice includes clogging caused by sticking of a colorant that occurs at the orifice. The following cases are considered as specific examples where sticking resistance is deteriorated.
(1) A case where a printer is left to stand without being used for a certain period of time.
(2) When an ink tank is formed integrally with an ink jet recording head, a case where the ink-jet recording head itself is left to stand in a state removed from a printer.
(3) When an ink tank is separable from an ink-jet recording head, a case where the ink tank is left to stand in a state removed from a printer.

It is accordingly an object of the present invention to provide an ink-jet recording ink that causes no problem of curling in a recording medium containing cellulose, such as plain paper, even when a great amount of inks are applied to the recording medium, and can meet high-definition recording of images while retaining good frequency responsiveness upon ejection at a high drive frequency, storage stability upon long-term storage of the ink, and resistance to sticking on an ink-jet recording head at high levels.

Another object of the present invention is to provide an ink-jet recording method that can stably form a high-quality image.

A further object of the present invention is to provide an ink-jet recording apparatus that can be applied to the ink-jet recording method.

The above objects can be achieved by the present invention described below.

SUMMARY OF THE INVENTION

The present inventors have carried out an investigation as to basic properties of an ink-jet recording ink against the above-described problem. As a result, it has been found that an ink of a composition containing a compound having a specific character can achieve the above-described object at an extremely high level, thus leading to completion of the present invention.

According to the present invention, there is thus provided an ink-jet recording ink comprising water, a colorant and a surfactant, wherein a content of the surfactant is 0.3 mass % or more based on the whole mass of the ink, and the ink further comprises a sucrose compound represented by the formula (i)

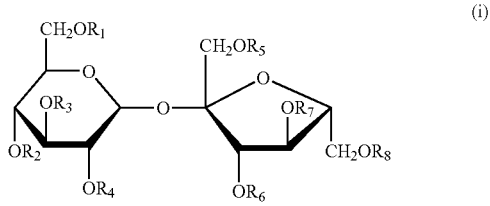

(i)

wherein $R_1$ to $R_8$ are individually selected from the group consisting of hydrogen, alkyl groups and alkylene oxide groups, with the proviso that at least one of $R_1$ to $R_8$ is an alkylene oxide group, the total number of alkylene oxide units possessed by the alkylene oxide group in a molecule is 1 to 20, and the proportion of an ethylene oxide unit to the total number of the alkylene oxide units in the molecule is 20.0% or more.

According to the present invention, there is also provided an ink-jet recording method comprising applying an ink to a recording medium containing cellulose by means of an ink-jet recording head, thereby forming an image, wherein the above-described ink is used as the ink.

According to the present invention, there is further provided an ink-jet recording apparatus comprising an ink tank containing the above-described ink, and an ink-jet recording head for ejecting the ink.

The ink according to the present invention causes no problem of curling in a recording medium containing cellulose even when the ink is used in ink-jet recording and applied in plenty to the recording medium, and can meet high-definition recording of images while retaining good responsiveness upon ejection at a high drive frequency, storage stability upon long-term storage of the ink, and resistance to sticking on an ink-jet recording head at high levels. With respect to the responsiveness upon ejection at a high drive frequency, the effect is marked when the ink according to the present invention is applied to a thermal ink-jet system to form an image.

DETAILED DESCRIPTION OF THE PREFERRED EMBODIMENTS

Figure 1:
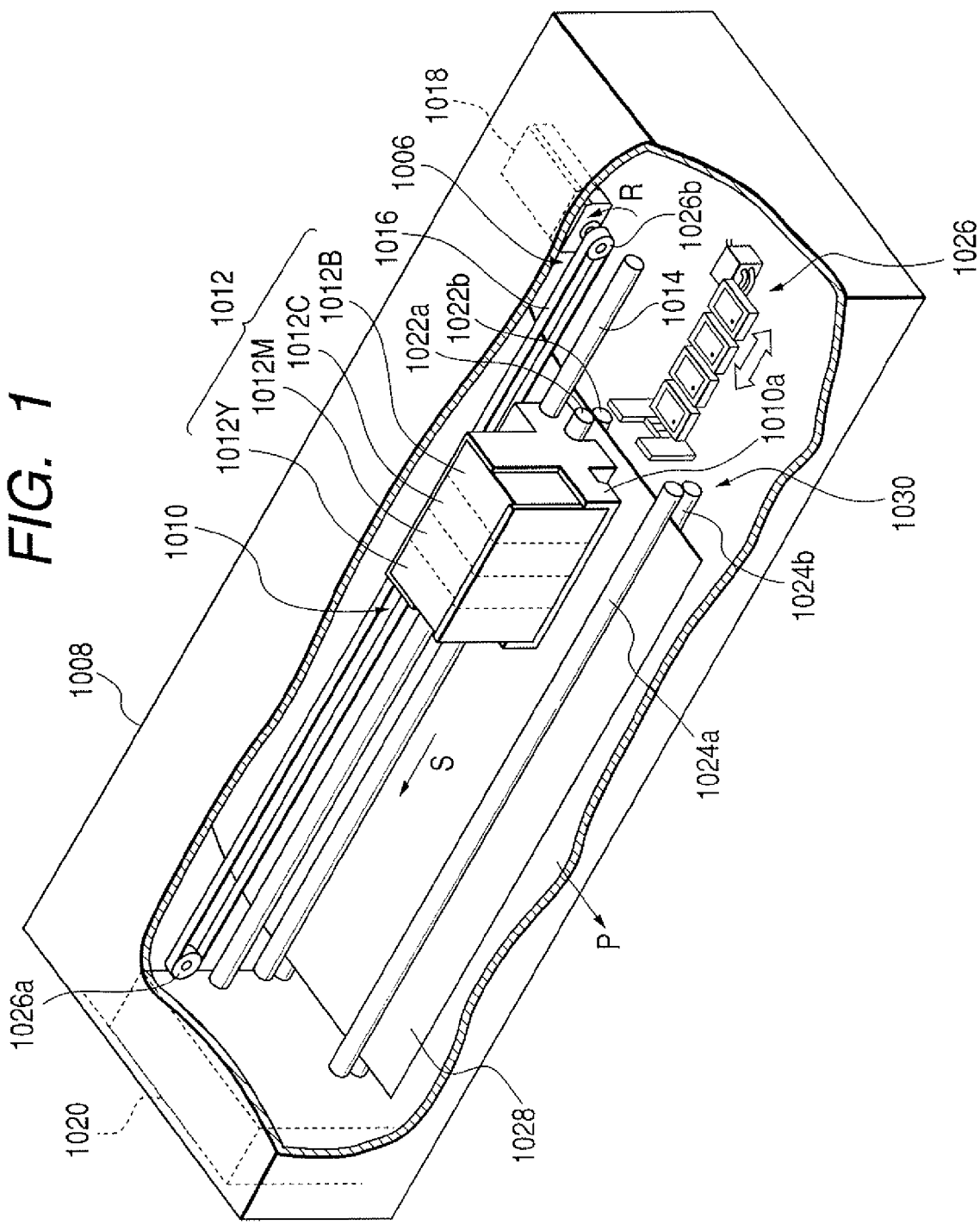
FIG. 1 is a schematic perspective view illustrating principal parts of an exemplary ink-jet printer, in which an ink-jet head can be installed.

The present invention will hereinafter be described in detail by the preferred embodiments.

The ink according to the present invention comprises water, a colorants a surfactant in an amount of 0.3 mass % or more based on the whole mass of the ink, and a sucrose compound represented by the formula (i)

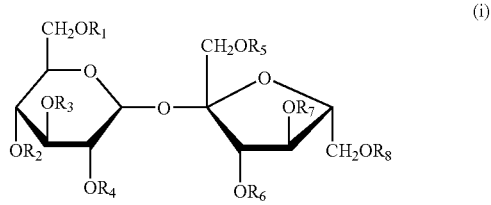

(i)

wherein $R_1$ to $R_8$ are individually selected from the group consisting of hydrogen, alkyl groups and alkylene oxide groups, with the proviso that at least one of $R_1$ to $R_8$ is an alkylene oxide group, the total number of alkylene oxide units possessed by the alkylene oxide group in a molecule is 1 to 20 s, and the proportion of an ethylene oxide unit to the total number of the alkylene oxide units in the molecule is 20.0% or more.

<Sucrose Compound Represented by the Formula (i)>

Hereinafter, a sucrose compound represented by the formula (i) will be described. The ink according to the present invention comprises a sucrose compound represented by the formula (i). The alkyl groups in the formula (i) may be any alkyl groups so far as the sucrose compound represented by the formula (i) is soluble in water. However, linear or branched alkyl groups having 1 to about 30 carbon atoms, specifically methyl, ethyl and propyl groups are preferred. These alkyl groups may have a substituent group. The substituent group is preferably that imparting water-solubility. As specific examples thereof, there may be mentioned a hydroxyl group.

The alkylene oxide group in the above formula is a group having alkylene oxide units (AO units). In the present invention, the alkylene oxide units preferably include both ethylene oxide unit (EO unit) and propylene oxide unit (PO unit).

The ethylene oxide unit and propylene oxide units in the present invention are organic groups having the respective structures shown below.

Ethylene oxide unit:

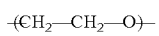

Propylene oxide unit:

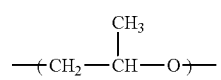

The sucrose compound used in the present invention and represented by the formula (i) used in the present invention has 1 to 20 such alkylene oxide units as exemplified above in a molecule. To have 1 to 20 alkylene oxide units means that the total number of alkylene oxide units possessed by $R_1$ to $R_8$ is 1 to 20 units. When a compound, the total number of alkylene oxide units of which exceeds 20 units, is used, the occurrence of curling can be inhibited to some extent. However, the viscosity of the resulting ink becomes too high, and refill of the ink into a nozzle cannot be made in time when the ink is continuously ejected at a high drive frequency, and so the ink becomes poor in the so-called frequency responsiveness upon ejection at high frequency to cause ejection failure due to beginning of the next ejection before the refill.

Further, in the sucrose compound represented by the formula (i), it is necessary that the proportion of an ethylene oxide unit to the total number of the alkylene oxide units is 20.0% or more. This means that for example, when the sucrose compound represented by the formula (i) has 20 alkylene oxide units in a molecule, the total number of ethylene oxide units must be 4 or more. When a compound, the proportion of ethylene oxide units of which is less than 20.0%, is used, the effect of inhibiting the occurrence of curling can be brought about. However, the water-solubility of the sucrose compound represented by the formula (i) is lowered, whereby the storage stability of the resulting ink becomes poor. This is attributable to the fact that the water-solubility of the ethylene oxide unit is high among the alkylene oxide units. In other words, the cause is considered to be that when the proportion of the ethylene oxide unit in the sucrose compound is less than 20.0%, the water-solubility of the sucrose compound is lowered to cause deposition or the like, thereby deteriorating the storage stability of the ink containing such a sucrose compound.

The sucrose compound with 1 to 20 alkylene oxide units added thereto, which is used in the present invention, may be variously synthesized in accordance with a method known per se in the art. Specific examples thereof include compounds having respective structures (A) to (H) shown in Table 1. Specific compounds corresponding to these compounds include Compounds 1 to 9 shown in Table 2. However, the present invention is not limited by these compounds. Further, sucrose and Comparative Compounds 1 to 7 are compounds contrary to the definition of the sucrose compounds according to the present invention.

When description is given taking Compound 4 shown in the table 2 as an example, 3 EO units are added to each of $R_2$, $R_5$ and $R_8$. Accordingly, the total number of AO units in a molecule is 9. When description is also given taking Comparative Compound 4 shown in the Table 2 as an example, 5 PO units are added to each of $R_1$ and $R_8$, and 2 EO units and 2 PO units are added to $R_5$. Accordingly, the total number of AO units in a molecule is 14, and the proportion of the EO units is 14.3%. No AO unit is added to sucrose.

TABLE 1

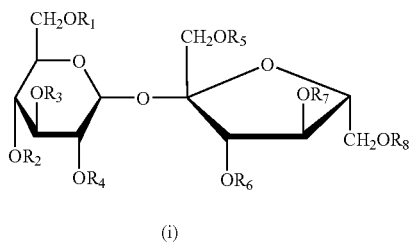

(i)

Structure of $R_n$ in the formula (i) (n: 1~8)

| | | |
|---|---|---|
| (A) | —(CH$_2$CHO)—H with CH$_3$ | PO unit = 1<br>Total number of AO unit = 1 |
| (B) | —(CH$_2$CHO)—(CH$_2$CH$_2$O)—H with CH$_3$ | EO unit = 1<br>PO unit = 1<br>Total number of AO unit = 2 |
| (C) | —(CH$_2$CH$_2$O)$_3$—H | PO unit = 3<br>Total number of AO unit = 3 |
| (D) | —(CH$_2$CHO)$_2$(CH$_2$CH$_2$O)$_2$—H with CH$_3$ | EO unit = 2<br>PO unit = 2<br>Total number of AO unit = 4 |
| (E) | —(CH$_2$CHO)$_5$—H with CH$_3$ | PO unit = 5<br>Total number of AO unit = 5 |
| (F) | —(CH$_2$CHO)$_5$(CH$_2$CH$_2$O)$_5$—H with CH$_3$ | EO unit = 5<br>PO unit = 5<br>Total number of AO unit = 10 |
| (G) | —(CH$_2$CHO)$_5$(CH$_2$CH$_2$O)$_{15}$—H with CH$_3$ | EO unit = 15<br>PG unit = 5<br>Total number of AO unit = 20 |
| (H) | —H | |

TABLE 2

|  | R₁ | R₂ | R₃ | R₄ | R₅ | R₆ | R₇ | R₈ | Total no. of EO units | Total no. of PO unit | Total no. of AO units | Proportion of EO unit |
|---|---|---|---|---|---|---|---|---|---|---|---|---|
| Compound 1 | (A) | (H) | (H) | (H) | (H) | (H) | (H) | (B) | 1 | 2 | 3 | 33.3 |
| Compound 2 | (H) | (H) | (H) | (H) | (H) | (H) | (H) | (B) | 1 | 1 | 2 | 50.0 |
| Compound 3 | (H) | (D) | (H) | (H) | (H) | (H) | (H) | (H) | 2 | 2 | 4 | 50.0 |
| Compound 4 | (H) | (C) | (H) | (H) | (C) | (H) | (H) | (C) | 9 | 0 | 9 | 100.0 |
| Compound 5 | (B) | (B) | (B) | (B) | (B) | (B) | (B) | (B) | 8 | 8 | 16 | 50.0 |
| Compound 6 | (H) | (H) | (H) | (H) | (D) | (H) | (H) | (E) | 2 | 7 | 9 | 22.2 |
| Compound 7 | (H) | (F) | (H) | (H) | (H) | (H) | (H) | (F) | 10 | 10 | 20 | 50.0 |
| Compound 8 | (H) | (H) | (H) | (H) | (H) | (H) | (H) | (G) | 15 | 5 | 20 | 75.0 |
| Compound 9 | (F) | (A) | (H) | (H) | (A) | (H) | (H) | (H) | 5 | 7 | 12 | 41.7 |
| Sucrose | (H) | (H) | (H) | (H) | (H) | (H) | (H) | (H) | 0 | 0 | 0 | — |
| Comp. Compound 1 | (C) | (C) | (C) | (C) | (C) | (C) | (C) | (C) | 24 | 0 | 24 | 100.0 |
| Comp. Compound 2 | (A) | (H) | (H) | (H) | (H) | (H) | (H) | (G) | 15 | 6 | 21 | 71.4 |
| Comp. Compound 3 | (E) | (A) | (H) | (H) | (A) | (H) | (H) | (A) | 0 | 8 | 8 | 0.0 |
| Comp. Compound 4 | (E) | (H) | (H) | (H) | (D) | (H) | (H) | (E) | 2 | 12 | 14 | 14.3 |
| Comp. Compound 5 | (H) | (A) | (H) | (H) | (A) | (H) | (H) | (A) | 0 | 3 | 3 | 0.0 |
| Comp. Compound 6 | (A) | (A) | (A) | (A) | (A) | (A) | (A) | (A) | 0 | 8 | 8 | 0.0 |
| Comp. Compound 7 | (H) | (H) | (H) | (H) | (H) | (H) | (H) | (E) | 0 | 5 | 5 | 0.0 |

The content of such a compound of the formula (i) as described above contained in the ink according to the present invention is from 0.5 mass % to 40 mass %, preferably from 1 mass % to 35 mass %, more preferably from 2 mass % to 30 mass % based on the whole mass of the ink. If the content of such a compound of the formula (i) as described above is less than 0.5 mass %, the curling described above may not be achieved in some cases. On the other hand, if the content of such a compound of the formula (i) as described above is more than 40 mass %, the viscosity of the ink may increase and ejection failure of the ink may occur in some cases.

All designations of "%" as will be used in the following mean mass % unless expressly noted.

<Aqueous Medium>

The ink according to the present invention comprises water as an essential component. The content of water in the ink is preferably 30 mass % or more and 95 mass % or less based on the whole mass of the ink.

The ink according to the present invention may also comprise an aqueous medium using water and a water-soluble solvent in combination. Specific examples of the water-soluble solvent used in combination with water include the following solvents:

Alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol and n-pentanol;

Amides such as dimethylformamide and dimethylacetamide;

Ketones and keto-alcohols such as acetone and diacetone alcohol;

Ethers such as tetrahydrofuran and dioxane;

Oxyethylene or oxypropylene polymers such as diethylene glycol, triethylene glycol, tetraethylene glycol, dipropylene glycol, tripropylene glycol, polyethylene glycol and polypropylene glycol;

Alkylene glycols the alkylene moiety of which has 2 to 6 carbon atoms, such as ethylene glycol, propylene glycol, trimethylene glycol, 1,4-butanediol and 1,5-pentanediol;

Triols such as 1,2,6-hexanetriol, glycerol and trimethylolpropane;

Lower alkyl ethers of glycols, such as ethylene glycol monomethyl (or monoethyl) ether, diethylene glycol monomethyl (or monoethyl) ether and triethylene glycol monomethyl (or monoethyl or monobutyl) ether;

Lower dialkyl ethers of polyhydric alcohols, such as triethylene glycol dimethyl (or diethyl) ether and tetraethylene glycol dimethyl (or diethyl) ether;

Alkanolamines such as monoethanolamine, diethanolamine and triethanolamine; and

Sulfolane, N-methyl-2-pyrrolidone, 2-pyrrolidone, 1,3-dimethyl-2-imidazolidinone, urea, ethyleneurea, bishydroxyethyl sulfone and diglycerol.

Among these water-soluble solvents, ethylene glycol, polyethylene glycol (average molecular weight: 200 to 1,000), glycerol, 1,2,6-hexanetriol, ethyleneurea and trimethylolpropane are preferably used, with ethyleneurea being particularly preferred. In the ink according to the present invention, no particular limitation is imposed on the kind and content of the water-soluble solvent used in combination with water. For example, the content thereof is preferably 3 mass % or more and 60 mass % or less based on the whole mass of the ink.

<Surfactant>

The ink according to the present invention comprises a surfactant in a specific amount as an essential component, specifically, an amount of 0.3 mass % or more based on the whole mass of the ink for the purpose of achieving good balance between ejection stability and storage stability in addition to the effect of inhibiting the occurrence of curling. By containing the surfactant in an amount of 0.3 mass % or more based on the whole mass of the ink, the sucrose compound represented by the formula (i) can be caused to be stably present in the ink, whereby the ink can be provided as an ink excellent in both ejection stability and storage stability in addition to the effect of inhibiting the occurrence of curling.

The surfactant may be any of such ionic surfactants, nonionic surfactants and ampholytic surfactants as mentioned below, or a mixture of two or more of these surfactants. However, a surfactant having the same polarity as that of a colorant in the ink or a nonionic surfactant is preferably used. The content of the surfactant in the ink is preferably from 0.3 mass % to 5 mass %, particularly preferably from 0.5 mass % to 4 mass % based on the whole mass of the ink. If the content of the surfactant is less than 0.3 mass % or more than 5 mass %, the ejection stability and storage stability described above may not be achieved in some cases.

<Nonionic Surfactant>

No particular limitation is imposed on the nonionic surfactant. However, polyoxyethylene alkyl ethers such as polyoxyethylene cetyl ether, and ethylene oxide adducts of acetylene glycol are particularly preferred. The HLB (hydrophile-lipophile balance) value of these nonionic surfactants is 10 or more.

<Ionic Surfactant>

Specific examples of the ionic surfactant used in the present invention will be described below. No particular limitation is imposed on the ionic surfactant.

<Anionic Surfactant>

Examples of anionic surfactants include fatty acid salts, salts of higher alcohol acid esters, alkylbenzene-sulfonates, salts of higher alcohol phosphates, salts of alkylsulfuric acids, salts of alkylsulfates, salts of dialkylsulfosuccinic acids, salts of alkylsulfoacetic acids and salts of sulfosuccinic acid dialkyl esters.

<Cationic Surfactant>

Examples of cationic surfactants include salts of aliphatic amines, quaternary ammonium salts and alkylpyridinium salts.

<Ampholytic Surfactant>

Examples of ampholytic surfactants include amino acid type and betaine type amphoteric surfactants.

<Other Additives>

Besides the above components, for example, a viscosity modifier, an antifoaming agent, a preservative, a mildewproofing agent and an antioxidant may be added as additives to the ink according to the present invention, as needed, to provide an ink having desired physical property values. It is preferable to select the additives in such a manner that the surface tension of the resulting ink is 25 mN/m or more, preferably 28 mN/m or more.

<Colorant>

Hereinafter a colorant will be described. The ink according to the present invention may comprise dyes and pigments. The content of the colorant in the ink is from 0.1 mass % to 15 mass %, preferably from 0.2 mass % to 12 mass %, more preferably from 0.3 mass % to 10 mass % based on the whole mass of the ink though the amount is not limited to this range.

Almost all water-soluble acid dyes, direct dyes, basic dyes and reactive dyes which are described in COLOR INDEX may be used as the dye used in the ink. Any dyes not described in COLOR INDEX may also be used so far as they are water-soluble dyes. Specific examples of the dyes used in the present invention are mentioned below. When the dyes used in the present invention are indicated by COLOR INDEX (C.I.) numbers, examples of a dye used in a yellow ink include C.I. Direct Yellow 86, 132, 142, 144 and 173, and C.I. Acid Yellow 17 and 23. Examples of a dye used in a magenta ink include C.I. Acid Red 35, 37, 52, 92 and 289. Examples of a dye used in a cyan ink include C.I. Acid Blue 1, 7, 9, 90 and 103, and C.I. Direct Blue 86, 87 and 199. Examples of a dye used in a black ink include C.I. Food Black 2, and C.I. Direct Black 52, 154 and 195. The dyes used in the present invention are, of course, not limited to these dyes.

In the present invention, pigments may also be used as colorants. Carbon black is preferably used in a pigment used in a black ink. Examples of usable carbon black include carbon black pigments such as furnace black, lamp black, acetylene black and channel black. In particular, that having such properties that the primary particle size is 15 to 40 nm, the specific surface area as measured by the BET method is 50 to 300 $m^2/g$, the DBP oil absorption is 40 to 150 ml/100 g, and the volatile matter is 0.5% to 10% is preferably used.

As pigments used in color inks, may be preferably used organic pigments. Specific examples thereof include the following pigments:

Insoluble azo pigments such as Toluidine Red, Toluidine Maroon, Hansa Yellow, Benzidine Yellow and Pyrazolone Red;

Water-soluble azo pigments such as Lithol Red, Helio Bordeaux, Pigment Scarlet and Permanent Red 2B;

Derivatives from vat dyes, such as alizarin, indanthron and Thioindigo Maroon;

Phthalocyanine pigments such as Phthalocyanine Blue and Phthalocyanine Green;

Quinacridone pigments such as Quinacridone Red and Quinacridone Magenta;

Perylene pigments such as Perylene Red and Perylene Scarlet;

Isoindolinone pigments such as Isoindolinone Yellow and Isoindolinone Orange;

Imidazolone pigments such as Benzimidazolone Yellow, Benzimidazolone Orange and Benzimidazolone Red;

Pyranthrone pigments such as Pyranthrone Red and Pyranthrone Orange; and

Thioindigo pigments, condensed azo pigments, diketopyrrolopyrrole pigments, Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet.

When organic pigments are indicated by COLOR INDEX (C.I.) numbers, specific examples thereof include the following pigments:

C.I. Pigment Yellow 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180 and 185;

C.I. Pigment Orange 16, 36, 43, 51, 55, 59, 61 and 71;

C.I. Pigment Red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255 and 272;

C.I. Pigment Violet 19, 23, 29, 30, 37, 40 and 50;

C.I. Pigment Blue 15, 15:1, 15:3, 15:4, 15:6, 22, 60 and 64;

C.I. Pigment Green 7 and 36; and

C.I. Pigment Brown 23, 25 and 26.

In the present invention, among these pigments, C.I. Pigment Yellow 13, 17, 55, 74, 93, 97, 98, 110, 128, 139, 147, 150, 151, 154, 155, 180 and 185, C.I. Pigment Red 122, 202 and 209, and C.I. Pigment Blue 15:3 and 15:4 are particularly preferred. However, the organic pigments are, of course, not limited these pigments.

<Dispersing Agent>

No particular limitation is imposed on the dispersing agent used for dispersing such a pigment as mentioned above in an aqueous medium so far as it is soluble in water. Specific examples thereof include block copolymers, random copolymers and graft copolymers composed of at least two monomers (with the proviso that at least one thereof is a hydrophilic monomer) selected from styrene, styrene derivatives, vinylnaphthalene, vinylnaphthalene derivatives, aliphatic alcohol esters and the like of α,β-ethylenically unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinyl acetate derivatives, vinylpyrrolidone, vinylpyrrolidone derivatives, acrylamide and acrylamide derivatives, and salts of these copolymers.

Among these dispersing agents, block copolymers are particularly preferred as dispersing agents upon performing the present invention. In particular, when recording is conducted by means of an ink-jet recording head using thermal energy at a high drive frequency, for example, 10 kHz or more, the block copolymer is used as a dispersing agent for the pigment in the ink according to the present invention, whereby the effect of improving the ejection stability is more markedly exhibited.

The content of the dispersing agent contained in the ink is preferably within a range of from 0.5 mass % to 10 mass %, more preferably from 0.8 mass % to 8 mass %, still more preferably from 1 mass % to 6 mass % based on the whole mass of the ink. If the content of the dispersing agent is more than the upper limit of this range, it is difficult to retain the desired ink viscosity.

The recording apparatus according to the present invention will hereinafter be described taking an ink-jet printer as a specific example. The recording apparatus according to the present invention maintains the ink cartridge containing the above mentioned ink according to the present invention and an ink-jet recording head which ejects the ink. FIG. 1 is a schematic perspective view illustrating principal parts of a liquid-ejecting head as a liquid-ejecting head of an ejection system that a bubble is linked to the air upon ejection, and an exemplary ink-jet printer that is a liquid-ejecting apparatus using this head.

In FIG. 1, the ink-jet printer comprises a conveying device 1030, a recording part 1010 and a moving and driving part 1006. The conveying device 1030 intermittently conveys paper 1028 as a recording medium, which is provided along a longitudinal direction in a casing 1008, in a direction shown by an arrow P in FIG. 1. The recording part 1010 is reciprocated in a substantially parallel direction along a guide rod 1014 in a direction of an arrow S substantially perpendicular to the conveying direction P of the paper 1028 by the conveying device 1030. Further, the moving and driving part 1006 is a driving means for reciprocating the recording part 1010.

The conveying device 1030 comprises a pair of roller units 1022a and 1022b and a pair of roller units 1024a and 1024b arranged in substantially parallel with and in opposed relation to each other, and a driving part 1020 for driving these respective roller units. By this construction, the paper 1028 is intermittently conveyed while it is held between the respective roller units 1022a and 1022b, and roller units 1024a and 1024b in a direction shown by the arrow P in FIG. 1 when the driving part 1020 of the conveying device 1030 is operated. The moving and driving part 1006 comprises a belt 1016 wound around pulleys 1026a and 1026b respectively provided on rotating shafts oppositely arranged at a prescribed interval, and a motor 1018 for driving the belt 1016 joined to a carriage member 1010a of the recording part 1010 arranged in substantially parallel to the roller units 1022a and 1022b in forward and reverse directions.

When the motor 1018 is operated to rotate the belt 1016 in a direction shown by an arrow R, the carriage member 1010a of the recording part 1010 is moved by the prescribed movement in the direction shown by the arrow S. When the motor 1018 is operated to rotate the belt 1016 in a direction reverse to the direction shown by the arrow R in FIG. 1, the carriage member 1010a of the recording part 1010 is moved by the prescribed movement in a direction reverse to the direction shown by the arrow S. At an end of the moving and driving part 1006, a recovery unit 1026 for conducting an ejection-recovery operation for the recording part 1010 is provided in opposed relation to an array of ink-ejection openings of the recording part 1010 at the home position of the carriage member 1010a.

In the recording part 1010, ink-jet cartridges (hereinafter may be referred to merely as "cartridges" in some cases) 1012Y, 1012M, 1012C and 1012B for respective colors, for example, yellow, magenta, cyan and black, are detachably mounted on a carriage member 1010a.

Figure 2:
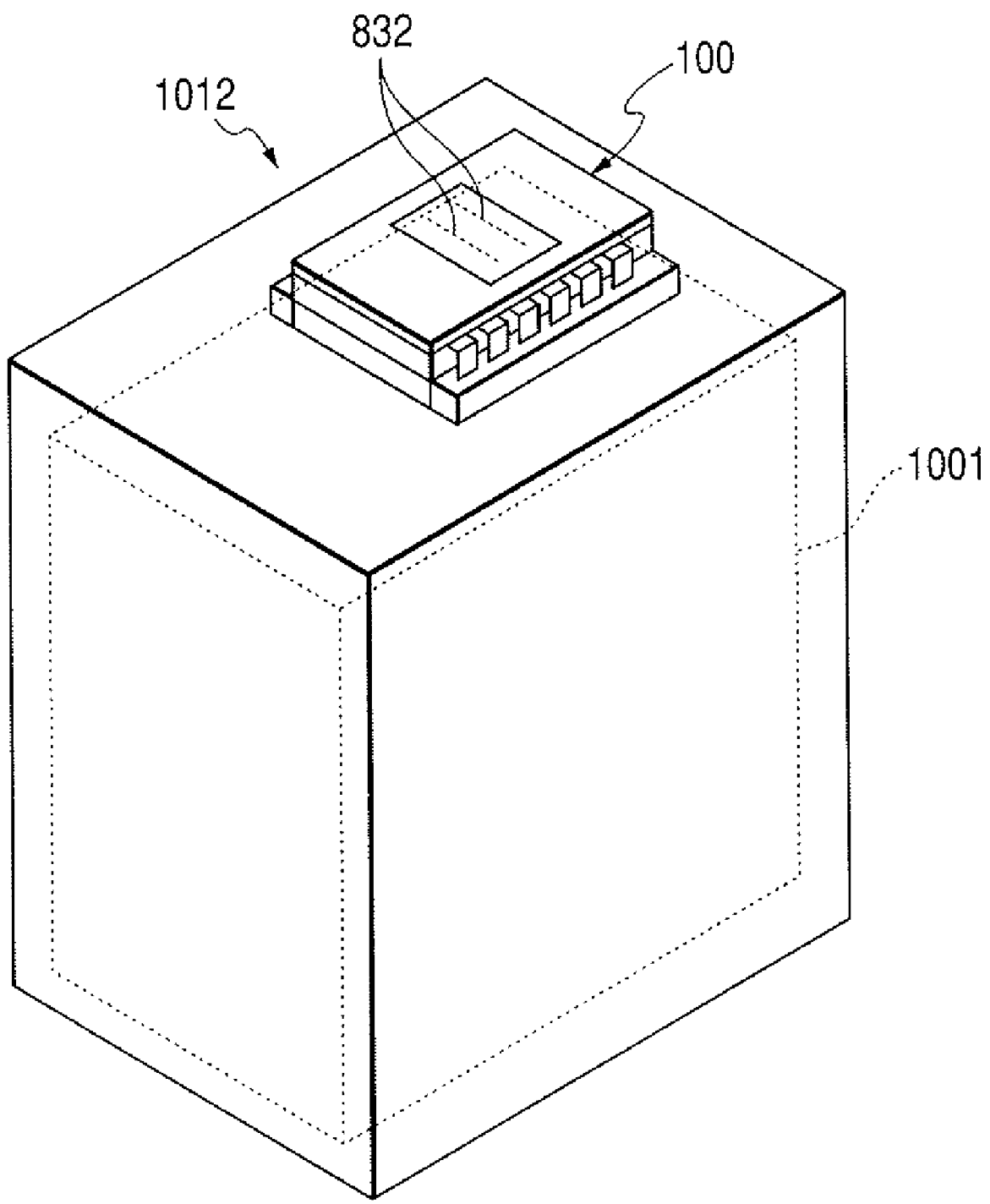
FIG. 2 is a schematic perspective view illustrating an exemplary ink-jet cartridge equipped with a liquid-ejecting head.

FIG. 2 illustrates an exemplary ink-jet cartridge capable of being mounted on the above-described ink-jet recording apparatus. The cartridge 1012 in the illustrated embodiment is of a serial type, and its principal part is constructed by an ink-jet recording head 100 and an ink tank 1001 for storing an ink.

In the ink-jet recording head (liquid-ejecting head) 100, a great number of ejection openings 832 for ejecting the ink are formed, and the ink is directed to a common liquid chamber (not illustrated) in the liquid-ejecting head 100 through an ink feed passage (not illustrated) from the ink tank 1001. The cartridge 1012 illustrated in FIG. 2 is so constructed that the ink-jet recording head 100 and the ink tank 1001 are integrally formed, and the liquid can be supplied to the interior of the ink tank 1001 as needed. In the cartridge 1012, however, a structure that the ink tank 1001 is replaceably joined to the liquid-ejecting head 100 may also be used. Incidentally, an ink-jet cartridge equipped with an ink-jet recording head is a recording unit.

EXAMPLES

The present invention will hereinafter be described more specifically by the following examples and comparative examples. Incidentally, all designations of "%" as will be used in the examples mean mass % unless expressly noted.

<Preparation of Pigment Dispersion Liquid>

(Pigment Dispersion Liquid 1)

An AB type block polymer having an acid value of 250 and a weight average molecular weight of 3,000 was first prepared in accordance with a method know per se in the art by using benzyl methacrylate and methacrylic acid as raw materials. The resultant block polymer was then neutralized with an aqueous solution of potassium hydroxide and diluted with ion-exchanged water to prepare a uniform 50 mass % aqueous solution of the polymer. With 180 g of the resultant aqueous solution of the polymer were mixed 100 g of C.I. Pigment Blue 15:3 and 220 g of ion-exchanged water, and the mixture was mechanically stirred for 0.5 hours (30 minutes). A microfluidizer was then used to treat this mixture by causing the mixture to pass through an interactional chamber 5 times under a liquid pressure of about 10,000 psi (about 70 MPa). The dispersion liquid obtained above was further subjected to a centrifugal treatment (at 12,000 rpm for 20 minutes), thereby removing undispersed matter including coarse particles to prepare Pigment Dispersion Liquid 1 of a cyan color. The thus-obtained Pigment Dispersion Liquid 1 was such that the concentration of the pigment was 10 mass %, and the concentration of the dispersing agent was 10 mass %.

(Pigment Dispersion Liquid 2)

With 100 g of the same aqueous solution of the polymer as that used in the preparation of Pigment Dispersion Liquid 1 were mixed 100 g of C.I. Pigment Red 122 and 300 g of ion-exchanged water, and the mixture was mechanically stirred for 0.5 hours (30 minutes). A micro-fluidizer was then used to treat this mixture by causing the mixture to pass through an interactional chamber 5 times under a liquid pressure of about 10,000 psi (about 70 MPa). The dispersion liquid obtained above was further subjected to a centrifugal treatment (at 12,000 rpm for 20 minutes), thereby removing undispersed matter including coarse particles to prepare Pigment Dispersion Liquid 2 of a magenta color. The thus-obtained Pigment Dispersion Liquid 2 was such that the concentration of the pigment was 10 mass %, and the concentration of the dispersing agent was 5 mass %.

(Pigment Dispersion Liquid 3)

An AB type block polymer having an acid value of 300 and a weight average molecular weight of 4,000 was first prepared in accordance with a method know per se in the art by using benzyl acrylate and methacrylic acid as raw materials. The resultant block polymer was then neutralized with an aqueous solution of potassium hydroxide and diluted with ion-exchanged water to prepare a uniform 50 mass % aqueous solution of the polymer. With 110 g of the resultant aqueous solution of the polymer were mixed 100 g of C.I. Pigment Yellow 128 and 290 g of ion-exchanged water, and the mixture was mechanically stirred for 0.5 hours (30 minutes). A micro-fluidizer was then used to treat this mixture by causing the mixture to pass through an interactional chamber 5 times under a liquid pressure of about 10,000 psi (about 70 MPa). The dispersion liquid obtained above was further subjected to a centrifugal treatment (at 12,000 rpm for 20 minutes), thereby removing undispersed matter including coarse particles to prepare Pigment Dispersion Liquid 3 of a yellow color. The thus-obtained Pigment Dispersion Liquid 3 was such that the concentration of the pigment was 10 mass %, and the concentration of the dispersing agent was 6 mass %.

(Pigment Dispersion Liquid 4)

An ABC type block polymer having an acid value of 350 and a weight average molecular weight of 5,000 was first prepared in accordance with a method know per se in the art by using benzyl methacrylate, methacrylic acid and ethoxyethylene glycol methacrylate as raw materials. The resultant block polymer was then neutralized with an aqueous solution of potassium hydroxide and diluted with ion-exchanged water to prepare a uniform 50 mass % aqueous solution of the polymer. With 60 g of the resultant aqueous solution of the polymer were mixed 100 g of carbon black and 340 g of ion-exchanged water, and the mixture was mechanically stirred for 0.5 hours (30 minutes). A micro-fluidizer was then used to treat this mixture by causing the mixture to pass through an interactional chamber 5 times under a liquid pressure of about 10,000 psi (about 70 MPa). The dispersion liquid obtained above was further subjected to a centrifugal treatment (at 12,000 rpm for 20 minutes), thereby removing undispersed matter including coarse particles to prepare Pigment Dispersion Liquid 4 of a black color. The thus-obtained Pigment Dispersion Liquid 4 was such that the concentration of the pigment was 10 mass %, and the concentration of the dispersing agent was 3.5 mass %.

<Preparation of Ink>

After the components shown in Table 3 were sufficiently mixed, the mixtures were filtered through a filter under pressure to prepare inks according to Examples 1 to 8 and Comparative Examples 1 to 8.

TABLE 3

| | Example | | | | | | | | Comparative Example | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| Colorant | | | | | | | | | | | | | | | | |
| Pigment dispersion liquid 1 | 20 | | | | | | | | 20 | | | | | | | |
| Pigment dispersion liquid 2 | | 45 | | | | | | | | | | | | 45 | | |
| Pigment dispersion liquid 3 | | | 50 | | | | | | | | 50 | | | | | |
| Pigment dispersion liquid 4 | | | | 30 | | | | | | | | | | | | |
| C.I. Direct Blue 199 | | | | | 3.5 | | | | | | | | | | 3.5 | |
| C.I. Acid Red 289 | | | | | | 3 | | | | | | 3 | 3 | | | |
| C.I. Direct Yellow 132 | | | | | | | 3 | | | | | | | | | 3 |
| C.I. Food Black 2 | | | | | | | | 2.5 | | 2.5 | | | | | | |
| Sucrose compound | | | | | | | | | | | | | | | | |
| Compound 1 | 16 | | | | | | | | | | | | | | | |
| Compound 2 | | | | | | | | | 25 | | | | | | | |
| Compound 3 | | | 12 | | | | | | | | | | | | | |
| Compound 4 | | | | 10 | | | | | | | | | | | | |
| Compound 5 | | | | | 8 | | | | | | | | | | | |
| Compound 6 | | | | | | 10 | | | | | | | | | | |
| Compound 7 | | | | | | | 15 | | | | | | | | | |
| Compound 8 | | | | | | | | 4 | | | | | | | | 4 |
| Compound 9 | | | | | | | | | | | | | | | | |
| Sucrose | | | | | | | | | | 16 | | | | | | |
| Comparative Compound 1 | | | | | | | | | | | 10 | | | | | |
| Comparative Compound 2 | | | | | | | | | | | | 15 | | | | |
| Comparative Compound 3 | | | | | | | | | | | | | | 12 | | |
| Comparative Compound 4 | | | | | | | | | | | | | | | 10 | |
| Comparative Compound 5 | | | | | | | | | | | | | | | | |
| Comparative Compound 6 | | | | | | | | | | | | | | | | |
| Comparative Compound 7 | | | | | | | | | | | | | | | | |

TABLE 3-continued

| | Example | | | | | | | | Comparative Example | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| Water-soluble organic solvent | | | | | | | | | | | | | | | | |
| Polyethylene glycol (*1) | | 8 | | | 5 | | | | | | | | | 6 | | 5 |
| Polyethylene glycol (*2) | | | | 2 | | | | | | | | | | | | |
| Ethyleneurea | | | | | 0.5 | | | | | | 0.5 | 0.5 | | 2 | | |
| 1,6-Hexanediol | | | 8 | | | | | | 8 | | | | | | | |
| Triethylene glycol | | | | 2 | | | | | | 2 | | | | | | |
| Trimethylolpropane | | | | | | 6 | | | | | | | 25 | | | |
| Diglycerol | | | | | 10 | | | | | | | | | 10 | | |
| Bishydroxyethyl sulfone | | | | | | | 9 | | | | | | | | | 9 |
| Ethylene glycol | | | | | | | | | | | | 15 | | | | |
| Surfactant | | | | | | | | | | | | | | | | |
| Acetylenol EH (*3) | 0.5 | 0.5 | 0.3 | | 0.5 | 0.5 | 0.3 | 1 | 0.5 | 0.3 | 0.5 | 0.5 | 1 | 0.5 | 0.5 | 0.2 |
| Polyoxyethylene cetyl ether | 0.5 | | 1 | 2 | | | | | 0.5 | 1 | | | | | | |
| Ion-exchanged water | 63 | 34.5 | 28.7 | 52 | 76 | 81 | 78.7 | 71.5 | 63 | 28.7 | 81 | 81 | 71.5 | 34.5 | 76 | 78.8 |

Note
(*1) Average molecular weight: 300
(*2) Average molecular weight: 200
(*3) Acetylene glycol ethylene oxide adduct (product of Kawaken Fine Chemicals Co., Ltd.).

<Evaluation>

The respective inks according to Examples 1 to 8 and Comparative Examples 1 to 8 were evaluated in the following manner. An ink-jet recording apparatus used in evaluation items (3) and (4) is shown in FIG. 1. Incidentally, an ink-jet recording head used herein had a recording density of 1,200 dpi, and the ejection volume per dot was 4 pl.

<Evaluation Items>

(1) Frequency Responsiveness:

An ink-jet recording head evaluation apparatus manufactured by Canon Inc. was used to conduct ejection of the ink at a drive frequency of 0.1 kHz. The frequency was measured at the time an ejected droplet became a form containing no main droplet to show unstable ejection with gradually increasing the frequency. This value was used to evaluate the ink as to the frequency responsiveness in accordance with the following standard. The evaluation results are shown in Table 4.

A: Exceeding 10 kHz;
B: 5 kHz or more and 10 kHz or less;
C: Less than 5 kHz.

(2) Storage Stability:

Each of the sample inks was placed in a Teflon container and left to stand for a month in a thermostat under an environment of 60° C. Thereafter, the ink-jet recording head evaluation apparatus manufactured by Canon Inc. was used to conduct ejection of the ink at a drive frequency of 0.1 kHz. The frequency was measured at the time an ejected droplet became a form containing no main droplet to show unstable ejection with gradually increasing the frequency. This value was used to evaluate the ink as to the storage stability in accordance with the following standard. The evaluation results are shown in Table 4.

A: Exceeding 10 kHz;
B: 5 kHz or more and 10 kHz or less;
C: Less than 5 kHz.

(3) Sticking Resistance (Clogging Resistance of a Nozzle):

After a recording head installed in a printer was removed from the printer and left to stand for a week under an environment of 35° C. and 10% humidity, the recording head was installed in the printer to check whether printing could be recovered by an ordinary recovery operation or not. The evaluation standard is as follows. The evaluation results are shown in Table 4.

A: Recovered by conducting one recovery operation for the recording head;
B: Recovered by conducting several recovery operations for the recording head;
C: Not recovered by recovery operation for the recording head.

(4) Curling Resistance:

Solid printing was conducted on an A4-sized PB Paper (product of Canon Inc.) with 2-cm blank spaces left at all peripheral sides of the paper. The resultant recorded article was placed under an environment of 30° C. and 55% humidity to measure the degrees of curling after 1 hour and 10 days, thereby evaluating each sample ink as to the occurrence of curling. The case where the paper of the recorded article was curled in a concave direction was regarded as plus curling, while the case where the paper was curled in a convex direction was regarded as minus curling, thereby measuring a distance from a curled end of the recorded article to a contact surface of the recorded article with a ruler. The evaluation standard is as follows. The evaluation results are shown in Table 4.

The recording area of the resultant recorded article was 431.8 cm$^2$. The density of ink of all examples was about 1.1 g/mL. The amount of the ink applied to the recording medium was 1.42 g/cm$^2$ in the above mentioned condition.

AA: Within ±10 mm;
A: More than ±10 mm, but within ±25 mm;
B: More than ±25 mm, but within ±40 mm;
C: In a condition that the curled end of the paper was warped on the inside of the paper;
D: In a condition that the curled end of the paper was rounded in the inside of the paper.

TABLE 4

|   |   | Example | | | | | | | | Comparative Example | | | | | | | |
|---|---|---|---|---|---|---|---|---|---|---|---|---|---|---|---|---|---|
|   |   | 1 | 2 | 3 | 4 | 5 | 6 | 7 | 8 | 1 | 2 | 3 | 4 | 5 | 6 | 7 | 8 |
| (1) Frequency responsiveness | | A | A | A | A | A | A | A | A | A | C | B | A | B | A | A | B |
| (2) Storage stability | | A | A | A | A | A | A | A | A | A | C | B | A | B | C | B | B |
| (3) Sticking resistance | | A | A | A | A | A | A | A | A | A | B | A | B | A | C | A | A | B |
| (4) Curling resistance | After 1 hr | A | AA | AA | A | AA | A | A | AA | B | A | A | C | AA | AA | AA | A |
|   | After 10 days | A | AA | A | A | AA | A | A | AA | B | B | B | D | AA | AA | AA | B |

From the results of Evaluation Items (1) to (4) shown in Table 4, it was confirmed that all the inks according to Examples 1 to 8 have good frequency responsiveness, storage stability, sticking resistance (clogging resistance of a nozzle) and curling resistance.

On the other hand, from the results of Comparative Example 1, it was confirmed that the ink comprising the sucrose compound to which no alkylene oxide unit is added is insufficient in curling resistance compared with the inks according to Examples. From the results of Comparative Examples 2 and 3, it was confirmed that the inks comprising the sucrose compound to which more than 20 alkylene oxide units are added are good in initial curling resistance (after 1 hour), but somewhat poor in curling resistance after days elapsed (after 10 days) and insufficient in frequency responsiveness, storage stability and sticking resistance compared with the inks according to Examples.

From the results of Comparative Example 4, it was confirmed that the ink comprising ethylene glycol in place of the sucrose compound represented by the formula (i) exhibits good frequency responsiveness, storage stability and sticking resistance, but is insufficient in curling resistance compared with the inks according to Examples. From the results of Comparative Example 5, it was confirmed that the ink comprising trimethylolpropane, which is known to inhibit the curling phenomenon, in place of the sucrose compound represented by the formula (i) exhibits good curling resistance, but is insufficient in frequency responsiveness, storage stability and sticking resistance compared with the inks according to Examples.

From the results of Comparative Examples 6 and 7, it was confirmed that when no ethylene oxide unit is added to the sucrose compound represented by the formula (i), or the proportion of the ethylene oxide unit to the total number of alkylene oxide units in a molecule is less than 20.0%, good curling resistance is exhibited, but the storage stability is insufficient. From the results of Comparative Example 8, it was confirmed that when the ink comprises the sucrose compound represented by the formula (i), but the content of the surfactant contained therein is less than 0.3 mass % based on the whole mass of the ink, good initial curling resistance (after 1 hour) is achieved, but curling resistance after days elapsed (after 10 days) is somewhat poor, and all the frequency responsiveness, storage stability and sticking resistance are insufficient.

This application claims the benefit of priorities from Japanese Patent Application No. 2004-355851 filed on Dec. 8, 2004, Japanese Patent Application No. 2005-332474 filed on Nov. 17, 2005, which are hereby incorporated by reference.

What is claimed is:

1. An ink-jet recording ink comprising water, a colorant and a surfactant,
wherein a content of the surfactant is 0.3% by mass% or more based on the whole mass of the ink, and
wherein the ink further comprises a sucrose compound represented by the formula (i)

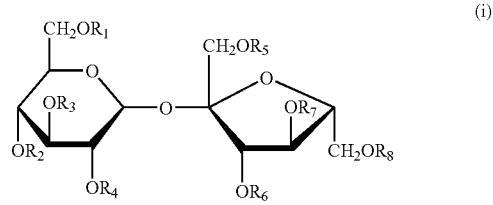

(i)

wherein $R_1$ to $R_8$ are individually selected from the group consisting of hydrogen, alkyl groups and alkylene oxide groups, with the proviso that at least one of $R_1$ to $R_8$ is an alkylene oxide group, the total number of alkylene oxide units possessed by the alkylene oxide group in a molecule is 1 to 20, and the proportion of an ethylene oxide unit to the total number of the alkylene oxide units in the molecule is 20.0% or more.

2. The ink-jet recording ink according to claim 1, wherein the surfactant is a nonionic surfactant.

3. The ink-jet recording ink according to claim 1, wherein the alkylene oxide units include an ethylene oxide unit and a propylene oxide unit.

4. The ink-jet recording ink according to claim 1, which is suitable for use in a thermal ink-jet system.

5. An ink-jet recording method comprising applying an ink to a recording medium containing cellulose by means of an ink-jet recording head, thereby forming an image, wherein the ink according to claim 1 is used as the ink.

6. The ink-jet recording method according to claim 5, wherein a recording area of the recording medium is 15 cm$^2$ or larger, and an amount of the ink applied to the recording medium is within a range of from 0.03 to 30 mg/cm$^2$.

7. The ink-jet recording method according to claim 6, wherein the amount of the ink applied is within a range of from 0.1 to 20 mg/cm$^2$.

8. The ink-jet recording method according to claim 5, wherein the recording medium is plain paper containing cellulose.

9. The ink-jet recording method according to claim 5, wherein the ink-jet recording head is a thermal ink-jet recording head.

10. An ink-jet recording apparatus comprising an ink tank containing the ink according to claim 1, and an ink-jet recording head for ejecting the ink.

11. The ink-jet recording apparatus according to claim 10, wherein the ink-jet recording head is a thermal ink-jet recording head.

* * * * *